(12) United States Patent
Romer et al.

(10) Patent No.: US 12,277,241 B2
(45) Date of Patent: *Apr. 15, 2025

(54) SECURE DOCUMENT MANAGEMENT SYSTEMS

(71) Applicant: Bargaining Table, Inc., Denver, CO (US)

(72) Inventors: Thomas Benjamin Romer, Denver, CO (US); Paul Joseph Lyman Schottland, Fort Mill, SC (US)

(73) Assignee: BARGAINING TABLE, INC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,370

(22) Filed: Dec. 11, 2023

(65) Prior Publication Data

US 2024/0241977 A1 Jul. 18, 2024

Related U.S. Application Data

(63) Continuation of application No. 18/098,102, filed on Jan. 17, 2023, now Pat. No. 11,841,962.

(51) Int. Cl.
*G06F 21/62* (2013.01)
*G06F 9/54* (2006.01)

(52) U.S. Cl.
CPC .......... *G06F 21/6209* (2013.01); *G06F 9/545* (2013.01); *G06F 2221/2141* (2013.01)

(58) Field of Classification Search
CPC ................. G06F 21/6209; G06F 9/545; G06F 2221/2141
See application file for complete search history.

(56) References Cited

U.S. PATENT DOCUMENTS

| | | |
|---|---|---|
| 7,484,245 B1 | 1/2009 | Friedman et al. |
| 11,841,962 B1 | 12/2023 | Romer |
| 2003/0079175 A1 | 4/2003 | Limantsev |
| 2004/0003190 A1 | 1/2004 | Childs et al. |
| 2004/0210535 A1 | 10/2004 | Erickson |
| 2007/0233794 A1 | 10/2007 | Singh |
| 2008/0040359 A1 | 2/2008 | Arrouye et al. |
| 2009/0265780 A1 | 10/2009 | Korkus et al. |
| 2009/0292930 A1 | 11/2009 | Marano et al. |

(Continued)

OTHER PUBLICATIONS

"Final Office Action received for U.S. Appl. No. 18/098,102, Mailed on Jul. 24, 2023".

(Continued)

*Primary Examiner* — Vance M Little

(74) *Attorney, Agent, or Firm* — Kutak Rock LLP; Jason S. Jackson

(57) ABSTRACT

Methods, systems, and apparatuses, including computer programs encoded on computer-readable media, for secure document management including receiving, at a kernel level of an operating system, a document access instruction for a document from a user level application. A document identifier associated with the document is retrieved. Document access permissions associated with the document identifier are determined. Whether the document access instruction for the document is allowable is determined based on the document access permissions. The document access instruction is allowed to proceed if the document access instruction is allowable. The document access instruction is denied if the document access instruction is not allowable.

17 Claims, 5 Drawing Sheets

(56) References Cited

U.S. PATENT DOCUMENTS

2011/0010612 A1 1/2011 Thorpe et al.
2021/0182344 A1 6/2021 Shyamkumar et al.

OTHER PUBLICATIONS

"Non-Final Office Action received for U.S. Appl. No. 18/098,102, Mailed on May 11, 2023".
"Notice of Allowance received for U.S. Appl. No. 18/098,102, Mailed on Aug. 4, 2023".

SECURE DOCUMENT MANAGEMENT SYSTEMS

CROSS-REFERENCE TO RELATED APPLICATIONS

This application is a continuation application of co-pending U.S. patent application Ser. No. 18/098,102 filed Jan. 17, 2023, the entire disclosure of which is incorporated herein by reference.

BACKGROUND

The following description is provided to assist the understanding of the reader. None of the information provided or references cited is admitted to be prior art.

Content Management Systems (CMSs) can range in complexity as documents are created and modified by multiple users providing input, review, signature, or other collaboration on a document. CMSs commonly restrict access to documents using account access controls. CMSs may also allow local downloads of a document or sharing or resharing of a document without process controls. Known CMSs provide controls to downloaded or shared documents using encryption.

Not all users that need access to a document may use the same CMS. Accordingly, protections that a CMS may provide are not available when the document is shared outside of the CMS or to another CMS. Email and cloud-based providers of document storage are common mechanisms used by people to share and collaborate on documents. Existing art protects or controls documents/files using only encryption and application-level controls (e.g., Microsoft IRM).

Attaching documents to emails is an easy and free form method of document management, but lacks controls. In addition, any versioning of the attachment is manual and security is difficult or non-existent. For example, there is a lack of security for document access. In addition, document version confusion arises from multiple iterations and manually created version numbers emailed back and forth.

Accordingly, a system that allows sharing of documents outside of or between any CMS while providing some document protections would be useful. In addition, it would be helpful for a system that allows controlled sharing of documents and information with security controls across multiple operating systems and versions. Further, it would be useful for such systems to provide this functionality without requiring users to install a specific application that is used to access and edit the shared document and information. Rather, it would be useful for users to be able to use any application of the user's choice to view and modify documents. Finally, it would be useful for such systems to provide this functionality without requiring the user to interact with documents outside of the native document application, such as Microsoft Word, Excel or Adobe PDF. Various described embodiments address one or more of these useful improvements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
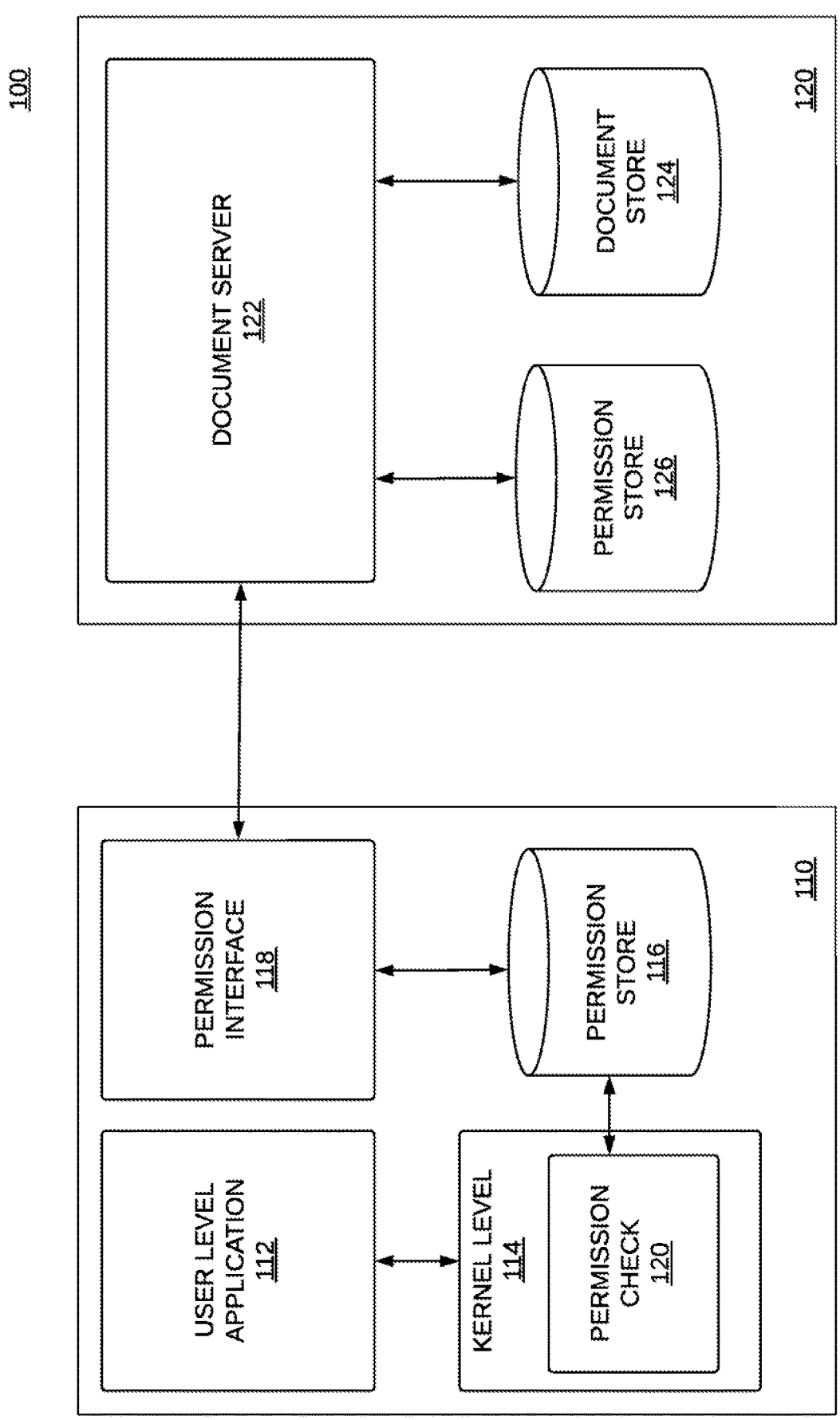
FIG. 1 is a diagram of a system for secure document management across multiple operating systems in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Various disclosed implementations provide access controls and protections to documents that may be shared across various different platforms and operating systems. For example, various implementations provide both user and kernel protection across various different operating systems. In addition, various implementations do not require any changes to existing applications to take advantage of the access controls and protections. Users are, therefore, able to use any application of their choosing to access shared documents, while access to the shared documents may still be controlled. Users are able to open and view and edit the documents in the native application, while security is preserved, regardless of the operating system platform which the user is using. This works for both local operating systems as well as virtualized systems for users. The present invention provides a novel method to provide protection or controls to a long-standing problem within existing operating systems, which today do not provide kernel-level document controls, as kernel level execution presently is ignorant of the object type and user account executing actions on the objects' memory and bytes stored relating to the object when operations are executed within Kernel mode.

Various disclosed implementations allow various controls on how documents are accessed, shared, edited, etc. For example, in one implementation, a user may receive a link to a document. The link may provide the user with permission to edit the document. The user is prevented, however, from sharing the document with anyone other than the person who sent the document to the user. The user, therefore, is prohibited from emailing the document as an attachment, uploading or saving the document to online or remote storage, or copying and pasting the contents of the document to an email or other document. In addition, the user may be prohibited from actions such as writing, printing, or saving the document to a different location on the user's computer. In addition, implementations may prevent copying or writing the document into a clipboard, a system clipboard, a printer path, a remote or local drive location, or into any other restricted location. For example, an implementation may prevent the copying of the document or parts of a document into a clipboard, thereby, preventing the document from being copied into another document. In some implementations, controls include the ability for a user to read or access the document a limited number of times, until a specific date/time or after a specific date/time. In some implementations, the controls may include the ability for a user to read or access the document only from geo-specific locations or specific hardware, or only after a second authentication mechanism successfully authenticates the user.

The controls may be set on individual documents or a group of documents. In addition, different users may have different controls and access permissions to the same document. Further, these controls may be provided across different operating systems. Further, users are able to edit or view a document, according to the user's permission, using any application. Accordingly, users are able to access a document while abiding by the relevant permissions outside of any CMS. In other implementations, the document is accessed via a CMS while the permissions associated with the document are still applied and adhered to.

Today, when a document or resource is shared via a document hosting or CMS, a URL link may be used to provide access to the document or resource. The URL may be embedded in an invitation email, and then forwarded to various different users. These users may then access the document or resource via the URL. The CMS system may implement a document forwarding endpoint, to connect the link and redirect to the document's location or provide the document to the caller. The invitation entreats the receiving party (aka "Sharee") to use or review the document, and is sent by the sharing-party (aka "Sharer"). In one implementation, an invitation contains two elements, the URL or URI to the resource being shared, and the destination email address and domain name of each Sharee. Upon a properly presented oAuth or other successful securitization of an identity access management system authentication, the user is able to retrieve the requested document. Today, this may be accomplished by using a common system such as Microsoft Corporation IRM (information rights management), which requires the installation of IRM as a common viewing platform, requiring the IRM client to be running as well as validation through IRM locally and remote validation or viewing within the IRM email or document add-on, outside of the native Outlook, Word, or Adobe PDF viewing applications. Using the system described herein, the validation is locally controlled and executed on the documents which are protected, and the end user is not easily able to defeat or work around this, all while Word, Outlook, Excel or PDF documents are available for viewing within their native applications. The user's access of the document will be secured as described in greater detail below.

In various implementations, a web-based document sharing system allows limited access to and secure use of shared documents. The sharing system ensures that only the intended recipients are allowed access to the shared documents. For example, the Sharer may designate who may access a document. In some implementations, users are identified by email addresses. The intended recipient's ability to re-share, forward, or extend the invite to others may be restricted.

For example, various implementations prevent a recipient from "re-sharing" a document with a third-party who has not been designated by the sharer as someone who is allowed access to the document, by (a) disallowing an undesignated third-party from accessing a document using the related URL link regardless of how such third-party gained access to such URL link or (b) preventing a Sharee from resharing a document from a local repository on the Sharee's computer. The following scenarios further illustrate features of various implementations.

Merger and Acquisition Documents—This is an example within the realm of documents which are commonly exchanged during M&A document negotiation activities.

Attorney A at Firm F, representing Client C, is seeking to negotiate an acquisition of Client C's company. Under the supervision of Partner P1 of Firm F, Attorney A will prepare the acquisition documents pursuant to which Client C's company will be acquired. The acquisition documents contain extremely confidential information about Client C and the company being sold. The negotiations are also very confidential and only certain designated people should be allowed to access the acquisition documents or even know that the acquisition is being contemplated. The acquisition will involve two potential competing acquirors, private equity firms PE1 and PE2, each of which have their respective law firms PEL1 and PEL2, and several attorneys and other professionals who will need to review and approve draft documents. Documents involved in the transaction may need to meet the following requirements and flows.

Attorney A drafts a non-disclosure agreement, purchase agreement, and other related documents using a user level application e.g., Word, on a first operation system, e.g., iOS.

Attorney A shares the proposed drafts for comment and approval to P1 and Client C. Each of P1 and Client C provide comments but not approval to the drafts. Attorney A incorporates the comments of P1 and Client C and recirculates drafts to both. After several revisions, Client C and P1 approve the draft documents. The various communications between A, P1 and Client C involving the draft documents are highly confidential, include potentially privileged communications and are attorney work product, the disclosure of which to third parties could significantly harm Client C. Firm F, Attorney A and P1 each take significant measures to ensure these communications are not inadvertently shared with third parties.

Until P1 and Client C approve the sharing of the draft documents with third parties, the document should not be shared beyond P1, Client C, and Attorney A. The communications amongst these individuals and the drafts of the document circulated prior to approval should not be shared without the express approval of Client C. Attorney A's attempt to share the draft documents with email accounts or users outside of the established user list for the document (whether or not intentional) would require approval by an user with authorization to approve the requested expansion of permissions to include the new account (e.g. P1 or Client C).

Once approved by P1 and Client C, A is free to choose and invite predetermined 'safe recipients' associated with the project (e.g. PE1, PE2 and their lawyers). If A would like to propose a new recipient, who does not already exist in the system, the new recipient must be approved by a designated approver.

Once a new recipient is approved, then and only then, can A invite the new recipient to view, review, comment, edit, or otherwise contribute to the draft document. This can include any or all permissions (e.g. review and edit), or a single permission such as only "sign this document."

Attorney A invites PE1 and PE2 and their respective attorneys PEL1 and PEL2 to review and edit each of the documents. PE1 and PE2 and their respective attorneys, however, may access different versions of the same document. Various implementations can incorporate a version control system to accomplish support of different versions of a document. This allows PE1 and PE2, and their respective attorneys, to separately view and edit the document. PE1 and PEL1 can see and exchange comments on a version of the document, specific to this grouping. PE2 and PEL2 can see and exchange comments on a different version of the document, specific to this different grouping. In each case, without the other grouping being able to see any proposed changes. This allows each grouping to confidentially share within the grouping comments and proposed changes to the draft documents in the same way that P1, A and Client C did. Since the various communications among the members of a group involving the draft documents are also highly confidential, include potentially privileged communications and are attorney work product, the disclosure of these communications to persons outside of the group could significantly harm the members of the group. Accordingly, as was the case with, A, P1, and Client C, without PE1's approval the proposed changes to the document being shared between PE1 and PEL1 should not be shared with third parties.

The invite (share) sent by Attorney A to PE1 can specify controlling restrictions such as preventing the document from being forwarded to unauthorized users or requiring a specific account be used when accessing the share. For example, PE1 may be prevented from sharing the document with a third-party competitor of Client C or may be required to use a specific gmail ID/account or Azure AD account or other oAuth provider to access the document. In addition, PE1 may only be able to access the document from a specific geographic region. Other restrictions that may be provided are the time of day for access, time period for access, ability to remove previous meta-data or edit tracking, or editing any multi-factor authentication requirement. Further, limitations on level of access such as read only, comment only, propose changes/edit subject to approval, direct edit/changes tracked, direct edit/changes untracked, full control may be used to control PE1's access to the document.

Each or all of these controlling restrictions can be required of each or all of the recipients or sharees of the document. The controls above are illustrative, not exhaustive, of all available possibilities. The controls may be provided by matching document ID to the identifying characteristics discussed herein.

In one implementation, the Sharee may be presented with the following ways to interact with the document which is shared via the URL in the invitation by the sharer. The Sharee may receive an invitation (via email, notification, text message, or other mechanism), and click the link in the invitation which redirects the recipient to the document or resource. The Sharee may authenticate using some existing scheme from the platform on which the document or resource resides. The Sharee is able to interact with the document or resource using whatever permissions are enforced by the platform on which the document resides.

Permissions associated with a document or resource may include allowing the editing of the document or downloading the document for later use. Other permissions may include allowing editing or commenting or otherwise interacting with the document via a 'web client' or a locally installed application to interact with the document.

FIG. 1 is a diagram of a system 100 for secure document management across multiple operating systems in accordance with an illustrative embodiment. The system includes a client device 110 and a remote system 120. The client device 110 and the remote system 120 communicate over a network.

The remote system 120 includes a document server 122, accessible to the client device 110, that provides access to documents and resources. Documents and resources may be stored in a document store 124. Documents and resources may have corresponding permissions. These permissions may be stored in a permission store 126. In some embodiments, the document store 124 and the permission store 126 may be the same data store or they may be separate data stores.

A user may access the document server 122 to create a document within or add a document to the secure document management system 100. For example, the user may upload a document. In some instances, the user accesses the system 100 via a web interface or a stand-alone application. Documents may also be created in the system as a blank document or from a template. The user is able to provide permissions associated with the document that control how users are able to access and interact with the document.

Documents and resources are associated with an identifier that uniquely identifies the document or resource within the system. The identifier may be created when the system 100 receives a document or a document is created. In some implementations, the permissions are associated with a document by storing the permissions and the document identifier in the permission store 126.

A user is able to access a document from the document server 122 by various means. For example, user may click on a URI that identifies a particular document or resource. The user may first have to authenticate with the document server 122. The CMS system may also employ an abstraction/service which listens on a specific port to redirect the caller to obtain the document or redirect to the document, once authenticated. Permissions associated with the document are retrieved and provided to the client device 110. The document may also be provided to the client device 110. A permission interface 118 may be used to receive the permissions and document. In various implementations, the permission interface 118 provides the interface between the client device 110 and the remote secure document access system 120. For example, the permission interface 118 may provide various information regarding the client device 110, such as the version of various software.

The user may use any application on the client device 110 to access the document. As described in greater detail below, the application used to access the document does not require any plug-in or modification to enforce the permissions. For example, a user level application 112 may be used to open and edit the document. The user level application 112 runs within the user space of an operating system. To access lower-level functions of the client device 110, the user level application accesses kernel level 114 functions. For example, an application uses kernel level functions to write data to a disk or memory.

In various implementations, permission check 120 functions hook into various different kernel level functions 114. For example, the permission check 120 may be called prior to the start of any kernel level write instruction. The permission check 120 functions may access a client-side permission store 116. The permission check 120 functions may then use the permissions associated with a document to determine if the kernel level functions should be allowed to proceed or restricted. For example, the permission check 120 function may be called when a write system call is received. The permission check 120 function may use permissions to determine if a document can be written to a particular destination. As the permissions are checked at the kernel level, any user level application 112 may be used to access the document while ensuring the user's interactions with the document are consistent with the document's permissions. Examples of user level applications 112 may include Microsoft Word, Adobe Acrobat, etc.

Various disclosed implementations may provide secure document access across various different operating systems. For example, different operating systems may be supported by implementing the permissions interface 118 and the permission check 120 functions for each supported operating system. When a user first downloads the access software, the permissions interface 118 and the permission check 120 functions corresponding to the user's operating system are downloaded and installed.

Figure 2:
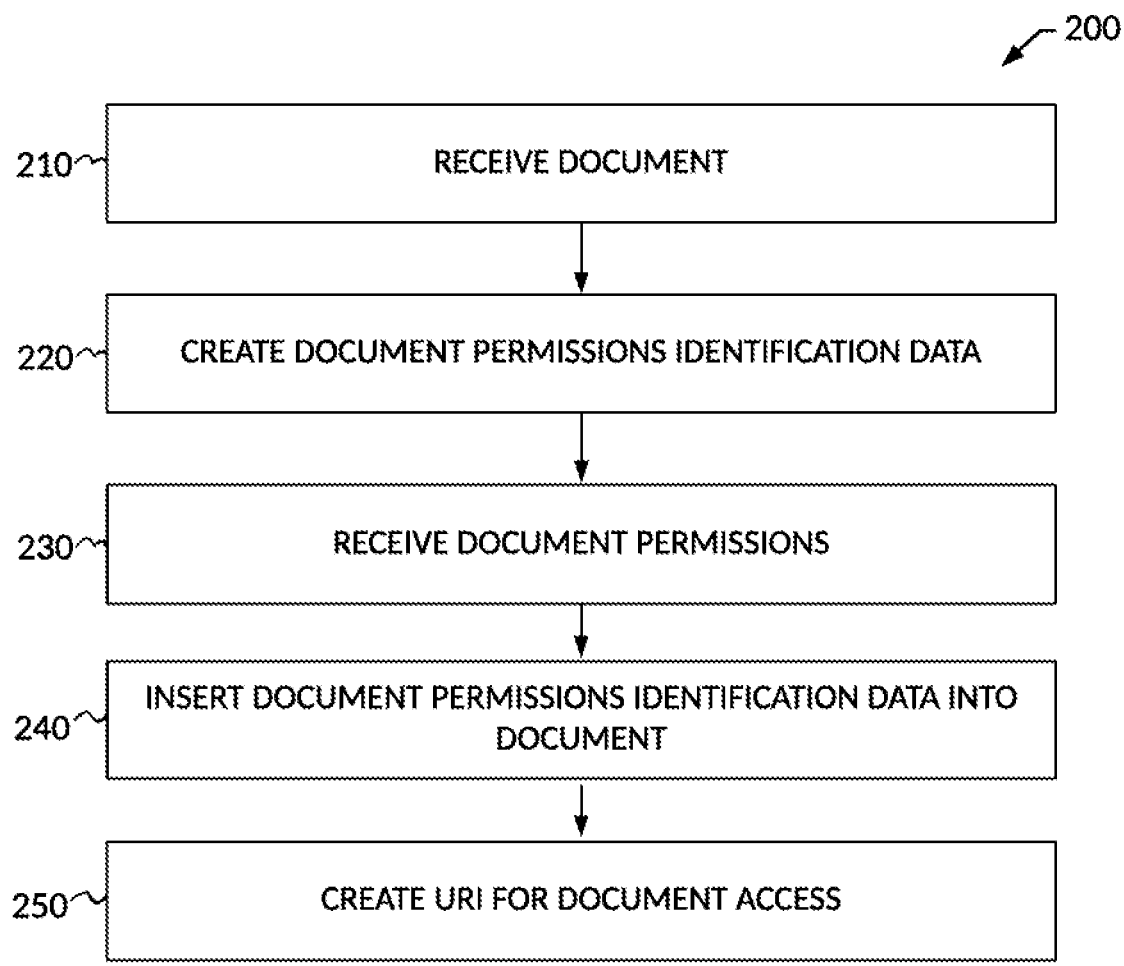
FIG. 2 is a flow diagram illustrating a process for creating a document in accordance with an illustrative embodiment.

FIG. 2 is a flow diagram illustrating a process 200 for creating a document in accordance with an illustrative embodiment. The process 200 can be implemented on a computing device, such as the remote system 120. In one implementation, the process 200 is encoded on a computer-readable medium that contains instructions that, when executed by a computing device, cause the computing device to perform operations of process 200.

At 210, a document is received. For example, the remote system 120, via the document server 122, may receive the document from the user of the client device 110. Prior to receiving the document, the document server 122 may require that the user authenticate prior to sending the document. The user may authenticate using any known systems such as oAuth or a system specific to the document server 122.

At 220, document permissions identification data is created. The identification data is used to identify permissions associated the document. In an example, the identification data may be a globally unique identifier (GUID). At 230, document permissions are received. For example, the user that provided the document may provide permissions associated with the document. The permissions indicate how the document may be accessed by users. The permissions may be user specific, time specific, location specific, or any combination of these. For example, the permissions may only allow specific users to edit the document. Other examples include, only allowing the document to be printed in certain areas, not allowing the document to be saved to paths after a particular date or time.

In addition to the above permission features, user actions may be controlled with permissions. For example, permissions may allow or deny printing the document, copying the document to the clipboard, copying the document to another local location, attaching the document to an email, renaming the document, printing the document, etc.

At 240, the document permissions identification data is inserted into the document. For example, the document permissions identification data may be added to the document as metadata. In some examples, the document permissions identification data is encrypted prior to being added to the document. In addition, in some examples, a bit within the file format of the file is changed to indicate that the document is secured. For example, Microsoft Word documents have spare bits within its file information block that may be used to indicate that the document is secured. In other examples, artifacts that do not impact how a document is viewed may be interested into the document.

At 250, a uniform resource identifier is created to access the document. The URI may be used by other users to access and download the document. Document access is described in FIG. 3.

Figure 3:
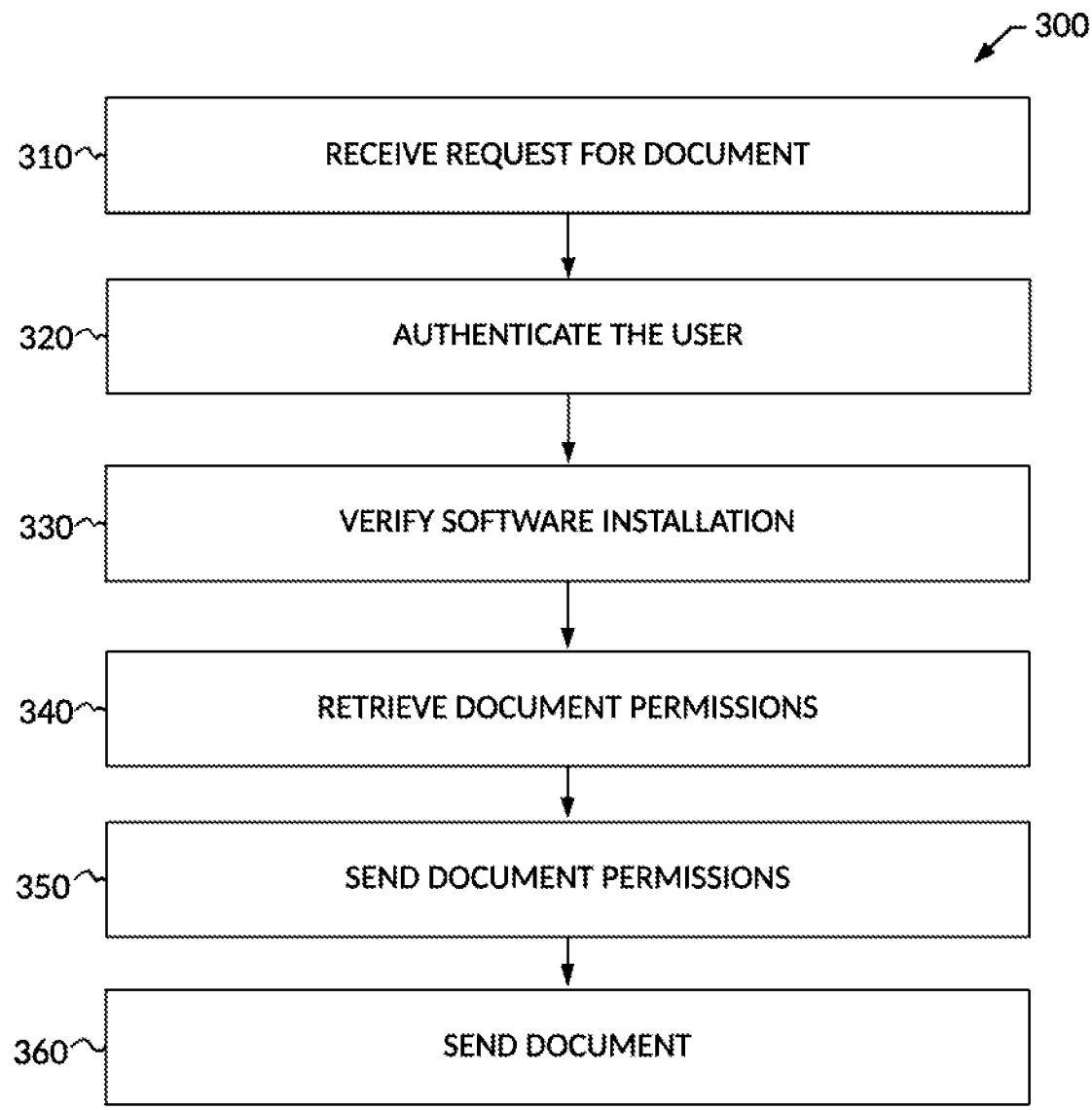
FIG. 3 is a flow diagram illustrating a process for sending a document to a user in accordance with an illustrative embodiment.

FIG. 3 is a flow diagram illustrating a process 300 for sending a document to a user in accordance with an illustrative embodiment. The process 300 can be implemented on a computing device, such as the remote system 120. In one implementation, the process 300 is encoded on a computer-readable medium that contains instructions that, when executed by a computing device, cause the computing device to perform operations of process 300.

At 310, a request for a document is received. For example, the document server 122 may receive a request from a client device 110. The request for the document may originate from the URI. In some examples, the permission interface 118 may be called when the URI is accessed. For example, a plugin or hook in the user's web browser may call into the permission interface 118. At 320, the user is authenticated. For example, the user may provide a username and password. Other examples of authentication may include using a third-party authenticator to authenticate the user with the system. At 330, the software installation is verified. For example, the permission interface 118 may provide an indication that the kernel level software is installed on the client device 110. This data may be included in the request for the document or provided separately. The permission interface 118 may also provide version information. The document server 122 may receive this information and verify that the client device 110 has the required software installed. If the software is not verified to be installed or if there is a new version of software, the document server can indicate the need to download or update the software. The user of the client device 110 may then update or install the software before gaining access to the requested document. In examples where the client device 110 does not have any of the required software installed, the document server 122 can deduce from the lack of receiving any software verification data from the client device 110 that the software needs to be installed.

Once the software is verified, the document permissions are retrieved, at 340. The request for the document includes the document permission identification data or some other data that can be used to determine the document permission identification data. The document permission identification data can be used to query the permission store 126 for the permissions associated with the requested document. The permissions may include permissions that are specific to the requesting user. In some examples, any permissions associated with other users are either not retrieved or removed prior to sending the document permissions. At 350, the document permissions are sent to the requesting user. At 360, the document is sent to the user. In some examples, the document and document permissions are sent in one payload. In other examples, the document and document permissions are sent separately.

Once the permissions are received by the permissions interface 118, the permissions interface 118 may store the permissions and document permissions identification in the permission store 116. The local permission store 116 may be accessed at the kernel level to determine how a user may interact with a document. In various implementations, the permissions are user level permissions in that the permissions are associated with a specific user. The kernel level, however, is unaware of the actual user of the device 110. As the permissions that are accessed by the kernel level process may be user specific, the secure document access system provides user level document access permissions at the kernel level.

Figure 4:
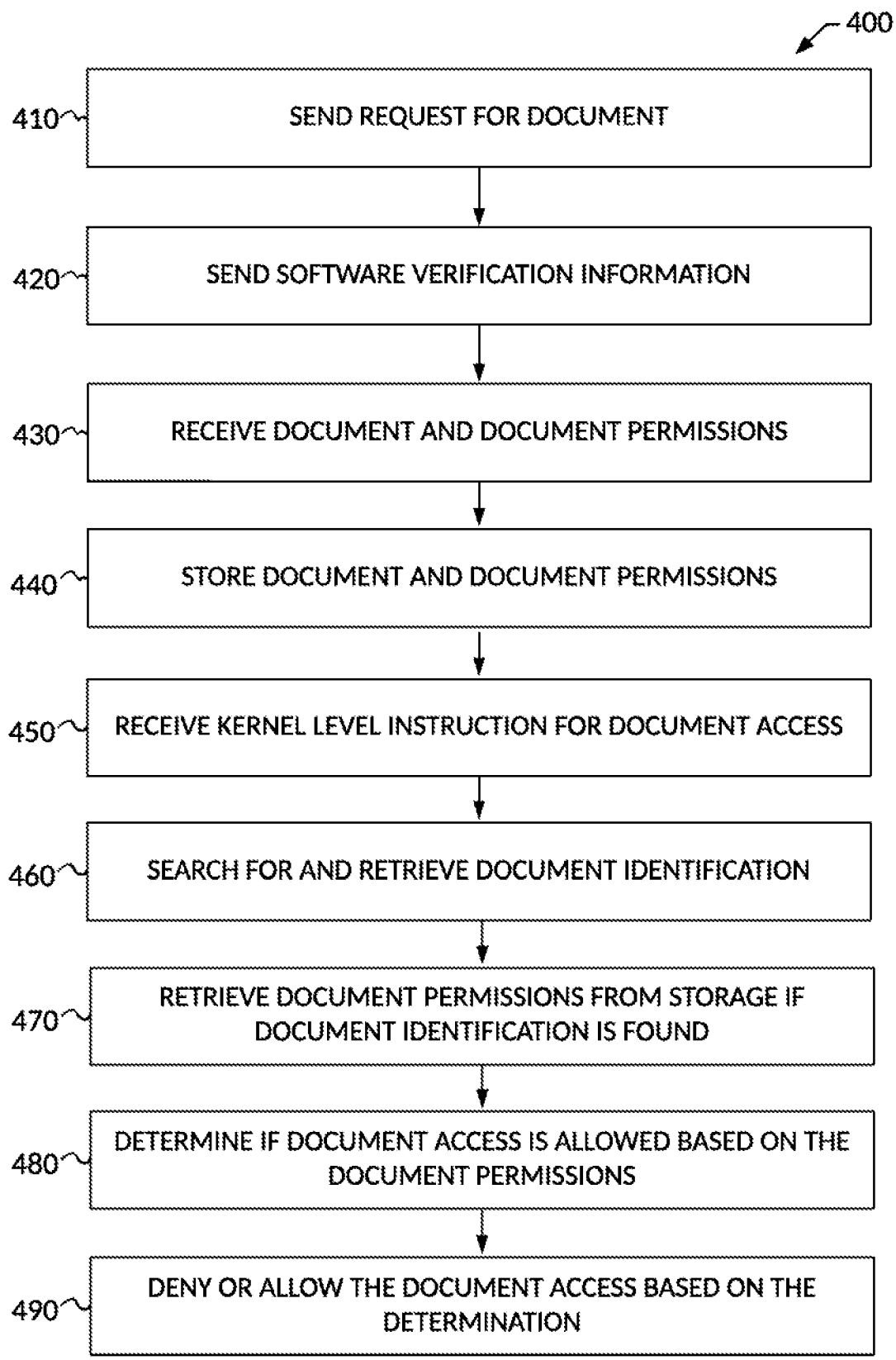
FIG. 4 is a flow diagram illustrating a process for secure document access in accordance with an illustrative embodiment.

FIG. 4 is a flow diagram illustrating a process for secure document access in accordance with an illustrative embodiment. The process 400 can be implemented on a computing device, such as the user device 110. In one implementation, the process 400 is encoded on a computer-readable medium that contains instructions that, when executed by a computing device, cause the computing device to perform operations of process 300.

At 410, a user may request access to a document. The document may be requested via a URI that has been sent to the user. The URI is directed toward the document server 122 and provides an identification of the specific document the user is requesting. Prior to accessing the document, the user may have to authenticate themselves with the document server 122. The document server 122 may verify that the authenticated user has permission to access to the requested document. If the user does not have permission to access to the document, the document server 122 may prevent the user from accessing the document. In some examples, the URI may be specific to the user requesting the document. In these examples, the document server 122 may verify that the authenticated user is the same user identified from the URI prior to allowing access to the document.

At 420, information regarding the installed software is sent to the remote server 120. In some examples, the information is sent to the document server 122. In other examples, the information may be sent to the remote server 120 or another server that verifies the required software is installed on the user device 110. In some examples, the information regarding the installed software is sent in the request for the document. For example, a web browser plug-in may be used to add information to the document URI request that indicates if the proper security software is installed. The security software may refer to the permission check 120 functions that ensures documents are securely accessed. In some examples, the information regarding the installed software includes the version of the security software. The remote server 120 may indicate that new software is available and must be installed prior to a user accessing the requested document. If the remote server 120 does not receive any information regarding installed software, the remote server 120 may redirect the user to a software download page or automatically start a download of the required software. For example, the required software may include the kernel level software and the permissions interface that together provide permission-based access to protected documents.

At 430, if the user device 110 has the required software, the permissions and the document are sent to the user device 110. At 440, the document and permissions are stored. The permission interface 118 may receive the permissions and store the permissions in the permission store 116. In some examples, the permissions are associated with the requesting user. In these examples, the permissions may include global permissions associated with every user and user specific permissions. The permissions may include paths that a user may save or move the document. In addition, the permissions may include other data that indicates how a user may interface with the document. For example, the permissions may include geolocation or timing information that restricts where or when the document may be edited, printed, saved, etc. In addition, there are permissions that may allow any user to write to certain directories, such as the trashcan path or temporary workspace directories. The document may be stored in any location on the user device 110.

In some examples, the permission interface 118 may log what documents have been downloaded and where those documents have been stored. If the secure software is later uninstalled on the user device 110, the downloaded documents may be deleted. The documents may be deleted, encrypted, or moved or copied elsewhere because the permissions associated with the documents can no longer be provided once the security software is uninstalled.

Once the document and permission are stored, the user may access the document using any software that the user prefers. The various disclosed examples do not require any editing/viewing programs nor any plugins or modifications to these programs to operate. When a user opens a secured document, the document is loaded by the viewing program.

At 450, a kernel level instruction for document access is received. In various examples, when the user saves a document, the application attempts to write the document to a path, such as local storage, remote storage, clipboard, etc. a kernel level write instruction is eventually issued. The kernel level write will indicate the destination path for the file. In addition, the kernel level write indicates the source file or source data that is being written.

As kernel operations are low level operations, the speed at which the operations complete is important. Slow kernel operations can result in an entire system being slowed down. In some examples, the permission check 120 accesses an efficient data store using the document name or destination path to determine if there are permissions associated with the document or path. For example, a hash or bloom filter may be used. The efficient data store allows for a quick method to determine if there are no permissions associated with the document. If there are no permissions, then the permission check 120 can indicate that the kernel instruction may proceed. If there are permissions, however, the permission check 120 may proceed to check to determine if the kernel level instruction should be allowed. In some examples, when a file is renamed, the permission check 120 can update the permission store 116 accordingly. In some examples, certain paths may also be allowed. For example, temp working directories may be expressly allowed even if the document does not allow the user to write the document.

At 460, the document is searched for the document permissions identification. In some examples, if the document identification is not found, the document is assumed to not be protected and the access to the document is allowed. In other examples where an efficient data store is used to determine if the document is expected to have document permissions identification, the lack of document permissions identification may signify that the document has been corrupted or tampered with. In these examples, the permission check 120 code can indicate that the requested access, e.g., a write, should be denied. When access is denied, an error can be displayed providing notification to the user.

At 470, if the document permissions identification is found, the permissions associated with the document may be retrieved. For example, the document permissions identification can be used to retrieve the document permissions from the permissions store 116. If the document permissions identification is encrypted, the kernel level 114 code may decrypt the document permissions identification. In another example, the permissions store 116 may decrypt the document permissions identification.

At 480, the document permissions are used to determine if the requested document access is allowed. At 490, if the permissions allow the requested access, then the access continues as normal. If, however, the access is denied, the kernel level 114 code stops the access from continuing. For example, the kernel level 114 code indicates that the current kernel level instruction should be stopped or aborted prior to completion.

As an example, a user may be attempting to attach a document to an email. The path associated with this activity indicates an email. The document permissions, however, may only allow a user to save the document. In this example, the permission check 120 would prohibit the write to the email from successfully completing. Other examples include, checking the current date to determine if the user's access has begun or expired. In addition, the permissions may indicate that the document may only be accessed during certain times of day, e.g., during working hours. In another example, the document permissions may provide a geographic location from which the document must be accessed or a geographic location that is not allowed to access the document. For example, a user may only be allowed to attach a document to an email while located within an area associated with the user's office.

The document permissions may indicate where a user may write a document or that a document is read only. If the user attempts to write a document to an unallowed path, the access is denied by the permission check 120. Knowing where the document or data associated with the document is destined, allows the security software to control whether copying and pasting (writing to the scratchpad/clipboard), printing (writing to a printer), attaching a document to an email, uploading to a remote server, saving to a different location, or renaming the document is permitted.

The permissions interface 118 may facilitate the retrieval and storage of secured documents and their associated permissions. The permissions interface 118 may be a web browser plugin or may be a stand-alone application. Received permissions may be stored in a permission store 116. As described above, document permissions may be associated with a specific user. For example, the permissions received with an associated document may be specific to the requesting user. The permission check 120 enforces the permissions that may be stored in the permission store 116. While the permission check 120 is running at the kernel level 114, the permission check 120 effectively provides user level security at the kernel level 114. In addition, as the permission check 120 is integrated at the kernel level 114, any application, without requiring any modification, may be used to access a protected document. The permission check 120 will be called automatically by the associated kernel level 114 function, such as a system write.

Figure 5:
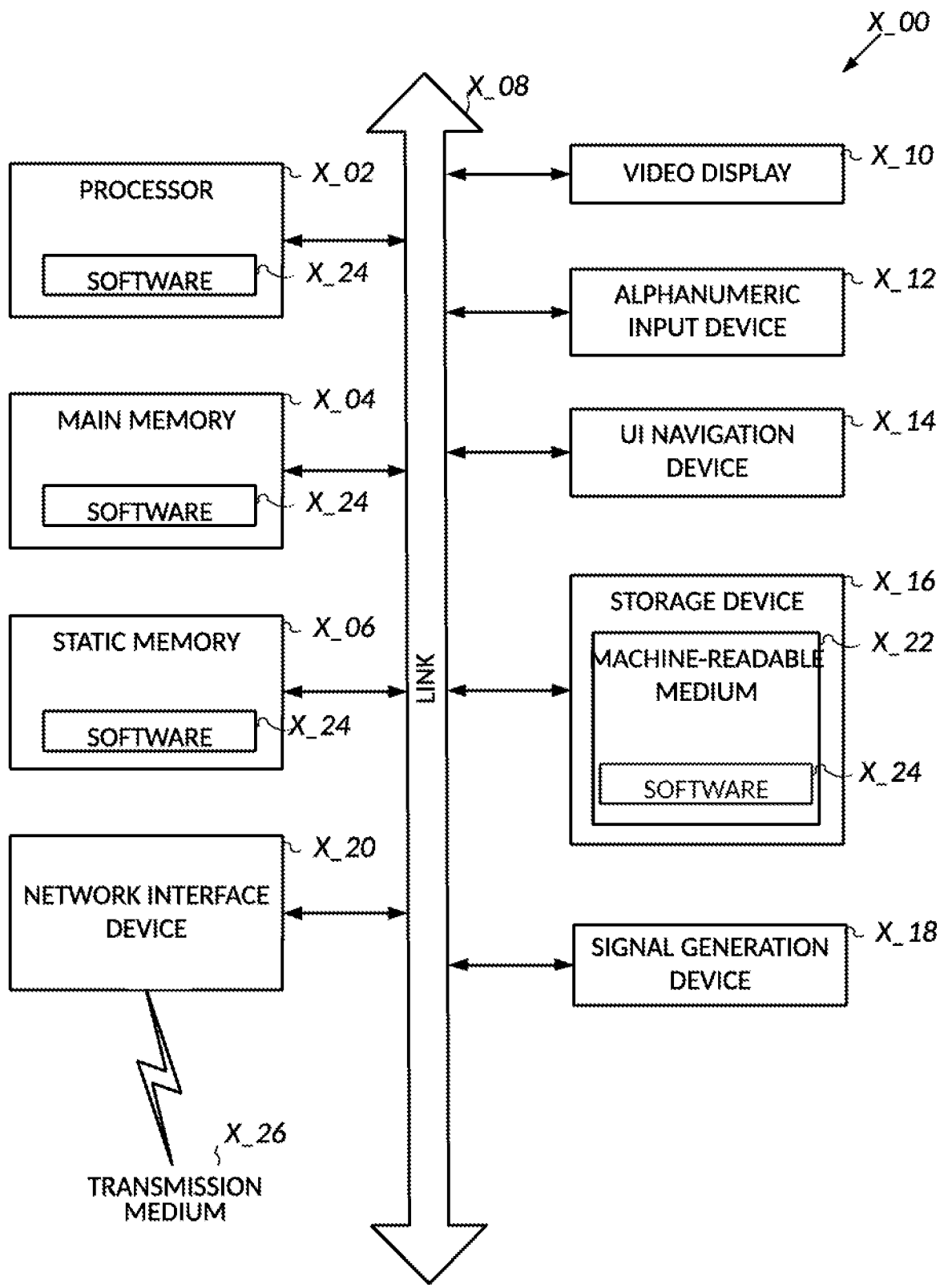
FIG. 5 is a block diagram of a computer system in accordance with an illustrative implementation.

FIG. 5 is a block diagram of a computer system in accordance with an illustrative implementation. The computing system 500 can be used to implement the web server, search service, advertisement service, etc., and includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 510 or other static storage device coupled to the bus 505 for storing static information and instructions for the processor 510. A storage device 525, such as a solid-state device, magnetic disk or optical disk, is coupled to the bus 505 for persistently storing information and instructions.

The computing system 500 may be coupled via the bus 505 to a display 535, such as a liquid crystal display, or active-matrix display, for displaying information to a user. An input device 530, such as a keyboard including alpha-numeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results.

What is claimed is:

1. A system for secure document management, the system comprising:
an operating system runnable on an electronic processor, the electronic processor configured to:
receive, at a kernel level of the operating system, a document access instruction for a document from a user level application;
retrieve, at the kernel level, a document identifier associated with the document, wherein the document contains the document identifier, and wherein the document identifier is inserted into the document by a second electronic processor that is remote from the electronic processor on which the operating system is runnable;
determine, at the kernel level, document access permissions associated with the document identifier;
determine, at the kernel level, if the document access instruction for the document is allowable based on the document access permissions; and
allow, at the kernel level, the document access instruction to proceed if the document access instruction is allowable.

2. The system of claim 1, the electronic processor configured to send a request for the document to a remote server.

3. The system of claim 2, wherein the electronic processor is further configured to send software access verification information to the remote server, wherein the remote server verifies the software access verification information prior to sending the requested document.

4. The system of claim 3, wherein the electronic processor is further configured to receive the document, wherein the document contains the document identifier.

5. The system of claim 4, wherein the document identifier is stored within metadata of the document.

6. The system of claim 5, wherein the document identifier is encrypted.

7. The system of claim 4, wherein the electronic processor is further configured to:
receive the document access permissions related to the document; and
store, in a local data store, the document access permissions and the document identifier, wherein the document access permissions are retrieved from the local data store to determine document access permissions associated with the document identifier.

8. The system of claim 1, wherein to determine if the document access instruction for the document is allowable based on the document access permissions the electronic processor is configured to:
determine a path associated with the document access instruction; and
verify the path is an allowed path based on the document access permissions.

9. The system of claim 1, wherein the document access instruction comprises a write instruction.

10. The system of claim 1, wherein the document access instruction is based on an attempt to attach the document to an email.

11. The system of claim 1, wherein the document access instruction is based on an attempt to write the document to a remote data store.

12. The system of claim 1, wherein the electronic processor configured to authenticate a user with a remote server, wherein the remote server stores the document and the document access permissions, and wherein the document access permissions comprise user specific permissions associated with the user.

13. The system of claim 1, wherein the user level application is unmodified with respect to the system.

14. The system of claim 1, wherein the electronic processor is configured to determine a current location of the system, wherein the document access permissions comprise location-based permissions.

15. The system of claim 14, wherein the location-based permissions only allow the document access instruction to occur within a certain geographic location.

16. The system of claim 1, wherein the document access permissions comprise time-based permissions.

17. The system of claim 16, wherein the time-based permissions deny the document access instruction after a particular time.

* * * * *